United States Patent [19]

Ludwig et al.

[11] Patent Number: 5,045,655
[45] Date of Patent: Sep. 3, 1991

[54] PANEL MOUNTED ELECTRICAL MODULE

[75] Inventors: Bernd Ludwig; Heinz Kleine, both of Marienheide, Fed. Rep. of Germany

[73] Assignee: Square D Company (Deutschland) GmbH, Fed. Rep. of Germany

[21] Appl. No.: 615,688

[22] Filed: Nov. 19, 1990

[30] Foreign Application Priority Data

Nov. 23, 1989 [EP] European Pat. Off. ............ 89121648

[51] Int. Cl.$^5$ .............................................. H01H 9/02
[52] U.S. Cl. .................................. 200/296; 248/27.1; 248/909; 361/346; 361/419
[58] Field of Search ................ 248/27.1, 27.3, 56, 248/909; 200/296, 245; 361/331, 346, 417, 419, 420, 427

[56] References Cited

U.S. PATENT DOCUMENTS

| 4,451,720 | 5/1984 | Ludwing ............... | 200/296 |
| 4,678,879 | 7/1987 | Kenway ............... | 248/27.3 X |
| 4,947,010 | 8/1990 | Heydner et al. ..... | 200/296 |

FOREIGN PATENT DOCUMENTS

| 074427 | 2/1985 | European Pat. Off. . |
| 0257208 | 5/1987 | European Pat. Off. . |
| 2623647 | 12/1977 | Fed. Rep. of Germany . |
| 2235510 | 1/1975 | France . |

*Primary Examiner*—Ramon O. Ramirez
*Attorney, Agent, or Firm*—Diller, Ramik & Wight

[57] ABSTRACT

An electrical command or information device housing of the type adapted to be affixed to an assembly plate through a substantially circular bore hole thereof which selectively includes or excludes a radially inwardly opening keyhole slot or notch includes a rib which projects radially outwardly from the housing and is adapted to be received in the keyhole slot. The rig has high shear resistance in a direction substantially tangential to the housing, but includes at least one notch for effecting relatively low force break off of the rib upon the application of radial or axial forces thereto.

20 Claims, 2 Drawing Sheets

PANEL MOUNTED ELECTRICAL MODULE

BACKGROUND OF THE INVENTION

This invention relates to an electrical module which is adapted to be mounted in a hole of an associated panel or assembly plate.

Electrical modules or devices, such as information or command devices in the form of switches handles, illuminated displays, etc. are known from European Patent Document B 0 074 427. In the conventional state of the art, such electrical modules or devices are affixed individually or most often in rows next to each other and/or in superposed relationship relative to associated panels or assembly plates. The electrical devices project to both sides of the assembly plate through an opening therein. One side of the electrical device corresponding to the exterior of the assembly plate is its operating or display side, whereas the opposite backside includes the electrical hardware, such as electrical terminals, switches, wiring, etc. Such electrical devices are technically denoted command and information devices, and they include push-button switches, cam switches and pilot lights which collectively are utilized to move a switch to a specified state and display the specified switch state through an appropriate illuminated light bulb. For example, if the electrical device is a push-button switch, the electrical hardware is located at the backside of the assembly plate whereas the push-button and a display light is located at the front side of the assembly plate so that the push-button can be pressed and illuminated to indicate the "on" condition and the reverse thereof.

The assembly plate includes one or more generally circular bore holes to affix the electrical devices thereto. It is conventional, as reflected by the aforementioned prior art, to provide the bore hole with a radially inwardly opening generally rectangular slot or groove. A solid tongue or rib integral with a housing of the electrical device enters the rectangular groove and functions to align or seat the electrical device housing within and relative to a particular bore hole of the assembly plate. This is a mass-produced assembly which has been found quite practical because it offers on the one hand accurate location, proper seating and easy assembly; while on the other hand the electrical device is prevented from rotating which is particularly important if the electrical device is subject to stresses, as, for example, cam switches which are operated through a rotating drive handle.

The latter described circular bore hole and keyhole slot with an associated rib or key on the electrical device housing is not applicable in all fields and is not mass produced for export because some countries do not provide conventional assembly plate circular bore holes with a rectangular keyhole slot or groove. Obviously, in such instances it is impractical after the manufacture of a circular bore hole in an assembly plate to provide a rectangular keyhole slot or groove by, for example, manually filing or milling the assembly plate at a periphery of the circular bore hole before the individual electrical devices are installed. On the other hand, mass production also rules out making two types of electrical devices in the first instance and delivering each to a potential user. That is, it is cost-prohibitive to manufacture one type of electrical device housing with a rib or key and another without a rib or key and likewise to provide an assembly plate with and without a keyhole slot, respectively. Furthermore, if the conventional electrical devices with solid keys or ribs are installed into circular bore holes or perforations which do not have a keyhole slot or groove, then the housings of the electrical devices will be deformed or the assembly plates will be deformed or both at least locally. Such deformation could hamper the operation of the electrical device. Therefore, it has been found to be necessary to remove the rib or key from each electrical device housing before installation to prevent improper operation as might occur should the housing of the electrical device be deformed, as would occur if the key or rib were retained. However, the removal of such ribs is laborious and time-consuming considering that the material is normally a tough and hard plastic which cannot be readily cut or milled off. If an attempt is made to break-off the rib, the electrical device housing may be damaged. Moreover, such electrical devices are equipped with tightly fitting seals and efforts toward breaking the ribs present the danger of damaging the seals or preventing the same from being properly positioned. It has been suggested in this regard to mount an axial parallel positioning pin at a stop surface of a projection of the electrical device housing, such that the pin will enter the keyhole slot of the bore hole in one application, but if the keyhole slot is lacking, the pin is merely broken off and not utilized. However, this design does not afford adequate security against rotation of the electrical device and its housing because the positioning pin will be bent, broken or sheared off in normal operation and under rotary load.

SUMMARY OF THE INVENTION

A primary object of the present invention is to provide a novel electrical device suitable for mass production which can be mounted to assembly plates or panels having generally circular bores, each of which either includes or excludes a radially inwardly opening generally rectangular keyhole slot or groove.

The novel solution to the conventional problem outlined earlier is that of providing the electrical device housing with a rib or key having at least one break off site constructed in such a manner that the rib will break off when subject to radial or axial load but has high shear-resistance in the tangential direction.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENTS

Figure 1:
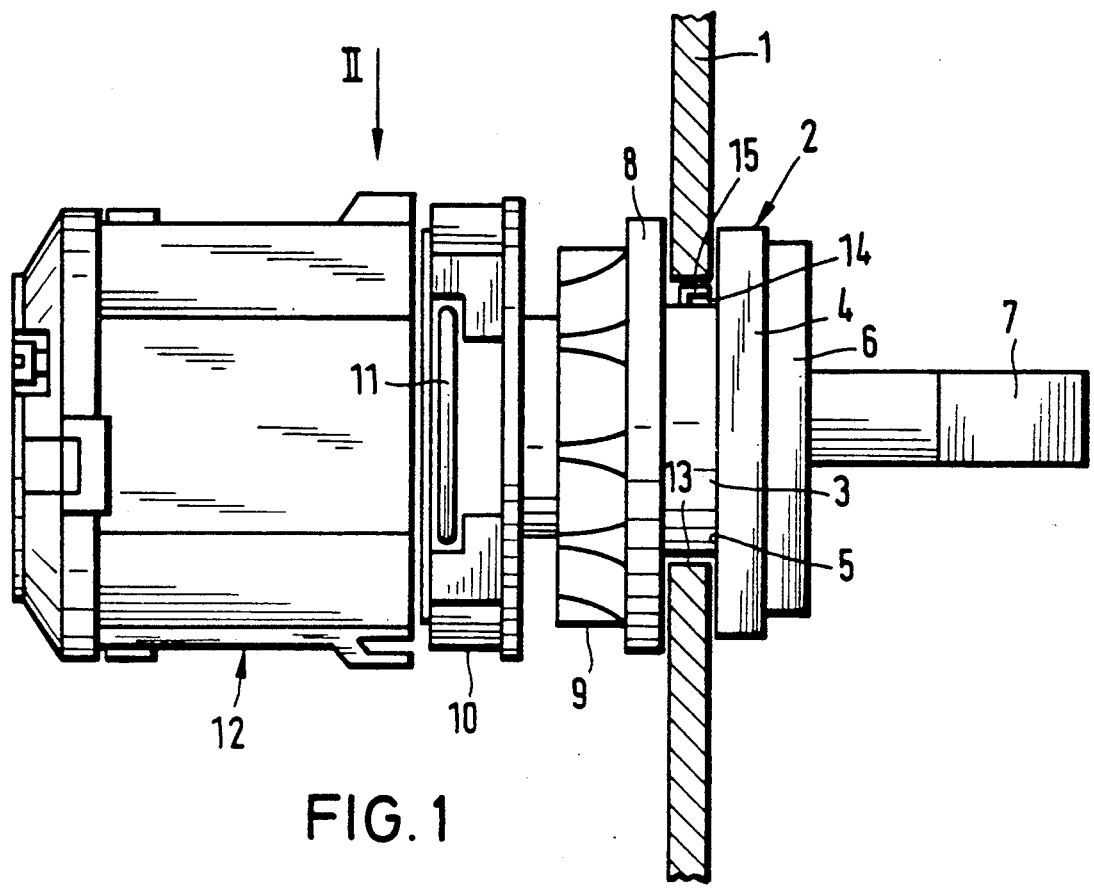
FIG. 1 is a schematic side elevational view with a part shown in fragmentary cross section of an electrical device of the present invention, and illustrates a housing having a cylindrical portion received in a bore of the assembly plate and a rib of the housing projecting into a radially outwardly opening slot of the bore.
Figure 2:
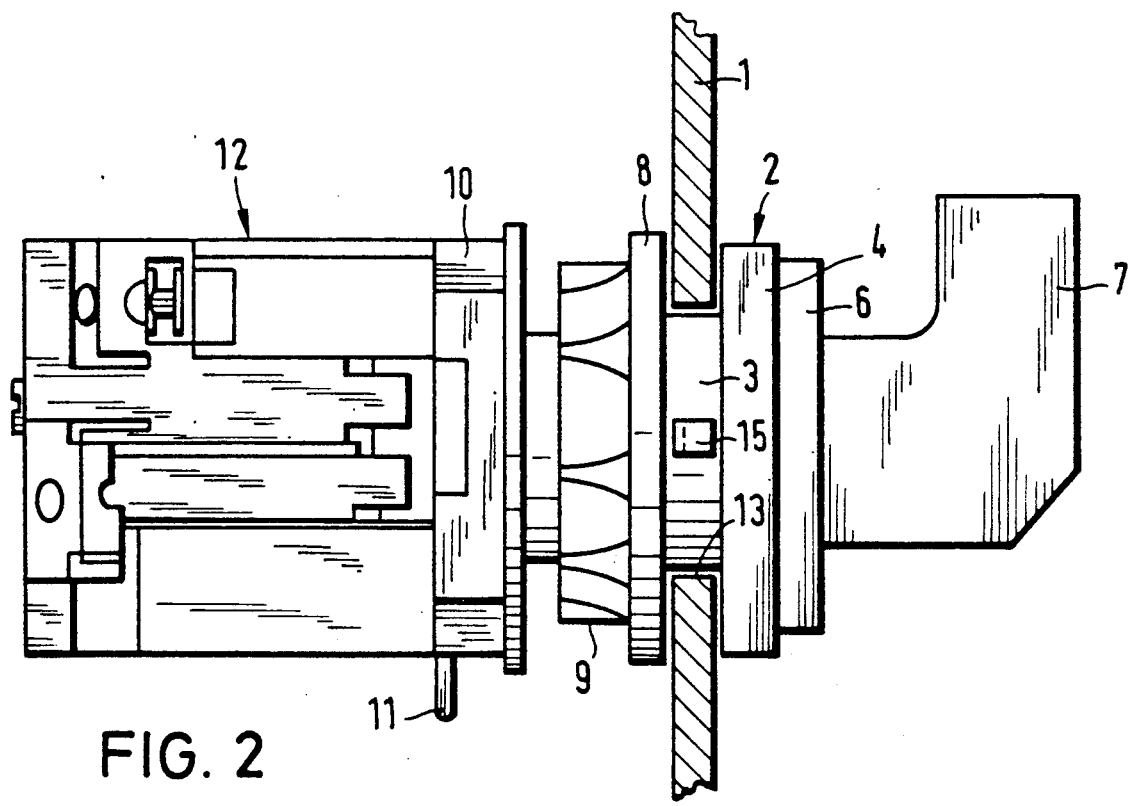
FIG. 2 is a schematic top elevational view similar to FIG. 1, and further illustrates the location of the rib on a portion of the housing.
Figure 3:
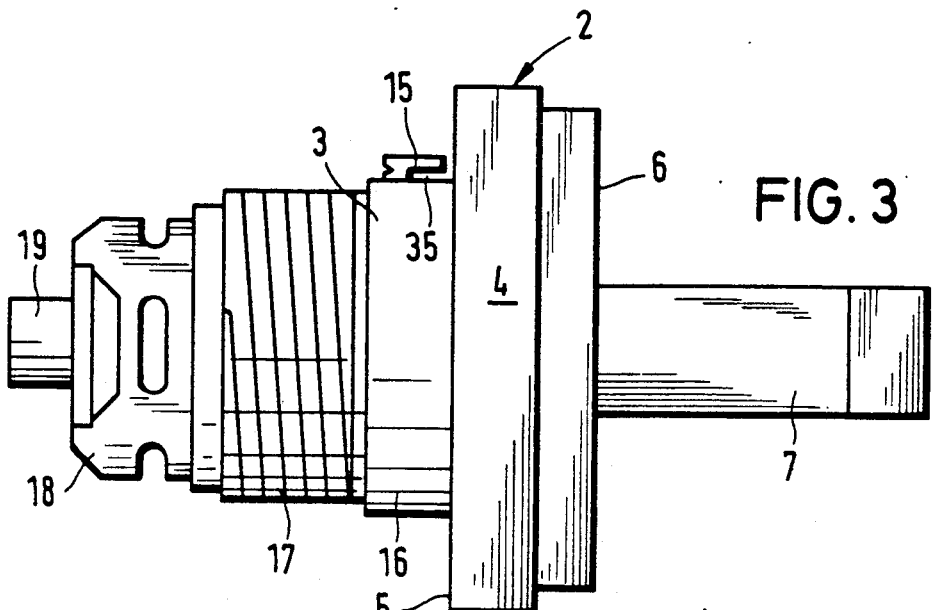
FIG. 3 is an enlarged schematic view of the right-hand portion of the housing illustrated in FIG. 1 absent the assembly plate, and illustrates detailed features thereof.

A novel electrical device or panel mounted electrical module constructed in accordance with this invention is illustrated in FIGS. 1 through 3 of the drawings and is typically a command and information device in the form of a cam switch which is inserted into a substantial circular bore hole or opening 13 formed in an assembly plate or panel 1. A housing 2 of the electrical device includes a cylindrical portion 3 housed within the bore hole 13. A flange 4 includes a stop surface 5 which rests against the outside surface of the assembly plate 1, which in FIGS. 1 and 2 is the right side surface of the assembly plate 1. An actuation member 6 has a drive handle 7 at the front side of the assembly plate 1. If the electrical device is not a cam switch, as illustrated, but instead a push button (not shown), the rotary drive handle 7 is, obviously, not utilized and in lieu thereof the actuation component 6 is simply a push button. A clamping nut 9 with a rubber ring 8 (shown enlarged) is mounted on the inside or backside of the assembly plate 1, which is the left side thereof, as viewed in FIGS. 1 and 2, through engagement with a thread 17 (FIG. 3). In this embodiment an adjoining coupling plate 10 carries a locking part 11 and electrical components, such as a switch, contacts, wiring, etc. located in a housing 12.

The circular hole or bore hole 13 is provided with a generally rectangular radially inwardly opening keyhole slot or groove 14. A rib or key 15 which projects from and is integral with the cylindrical portion 3 of the electrical device housing 2 is seated in the keyhole slot 14 and thereby locates the housing 2 relative to the assembly plate 1 and prevents relative rotation between the two. As is evident from FIG. 3, the portion of the housing 2 shown in this figure can be simply inserted into the hole 13 of the assembly plate 1 from right-to-left, as viewed in FIGS. 1 and 2, after which the O-ring 8 and clamping nut 9 are secured upon the thread 17. A square bar 19 projects from a connector 18 and functions to operate the electrical switches or components within the housing 12 upon the rotation of the handle 7 in a conventional manner when the housings 2, 12 are connected together, as shown in FIGS. 1 and 2.

Figure 4:
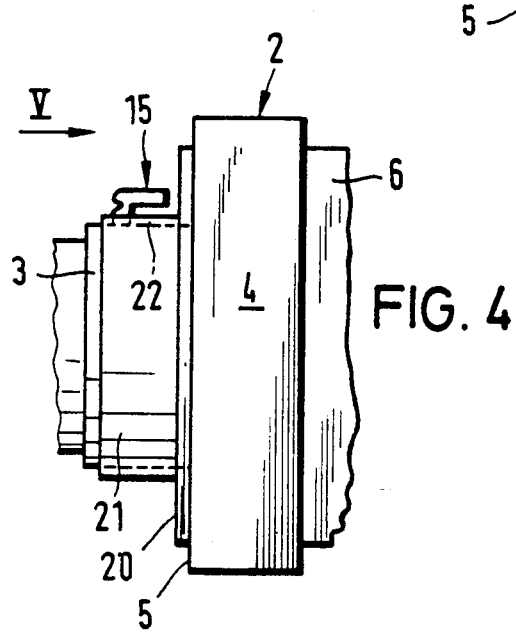
FIG. 4 is a fragmentary elevational view of the portion of the electrical housing shown in FIG. 3, and additionally illustrates a seal positioned upon a circular portion of the housing.
Figure 5:
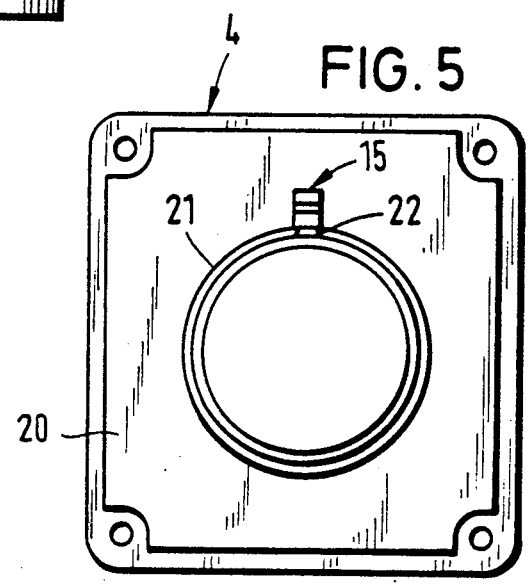
FIG. 5 is an end view looking generally along the arrow V of FIG. 4, and illustrates the details of the seal and a slot through which projects the rib.

Reference is made to FIGS. 4 and 5 of the drawings which illustrate the cylindrical portion 3, the key or rib 15, the circular hole 13 and the keyhole slot or groove 14. The seal includes a rectangular sealing plate 20 which abuts against the stop surface 5 of the flange 4 of the electrical housing 2. The sealing plate or flange 20 includes a hole (unnumbered) corresponding in size to the cylindrical portion 3 of the electrical housing 2. An integral cylindrical sealing tube 21 projects from the flange or sealing plate 20 and is in exterior telescopic surrounding relationship to the cylindrical portion 3 of the housing 2. The axial length of the sealing tube 21 essentially corresponds to the wall thickness of the assembly plate 1. The sealing tube 21 also includes a notch or slot 22 which passes completely therethrough and through which can pass the rib 15. The clearance 22 is so designed that the sealing tube 21 can adequately seal the area of the bore hole 13 and the notch or groove 14 even after the rib 15 has been broken off, as will be discussed further hereinafter. If desired, the outside of the sealing tube 21 may advantageously comprise a number of compressible bosses (not shown) to improve adhesion against the inside of the bore hole 13.

Figure 6:
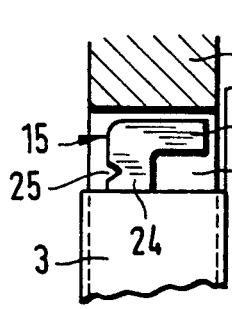
FIGS. 6 through 9 are fragmentary views of the housing and assembly plate including the bore of the latter, and illustrates ribs of four different configurations associated with the electrical device housing.

A preferred embodiment of the rib 15 is shown in FIG. 6 which is of a generally L-shaped configuration. The L-shaped rib or key includes a radial leg portion 24 and an axial leg portion 23. The radial leg portion 24 is forwardmost relative to the direction of insertion of the rib 15 into the slot 14. That is, as the rib 15 enters the slot 14, the radial leg portion 24 enters the slot 14 first followed by the axial leg portion 23. Because of this direction of insert, a corner (unnumbered) between the leg portions 23, 24 is rounded to facilitate alignment and insertion of the key 15 into the slot 14. The axial leg portion 23 is parallel to the axis of the cylindrical portion 16, as well as the circular hole 13, but is spaced from the cylindrical portion 16 to provide a narrow gap or slot 35. Due to this design of the rib 15, when the rib is stressed radially or axially relative to the housing 20, by, for example, the insertion and manipulation of a screwdriver blade within the narrow gap 35, the axial leg portion 23 can be broken off close to the exterior surface (unnumbered) of the cylindrical portion 3. In order to facilitate such breakage, weakening means in the form of a rupture notch 25 is provided in the radial leg portion 24 at a point extremely close to the exterior surface of the cylindrical portion 3. By inserting a tool, such as the blade of a screwdriver, in the gap 35 and rotating the same, a radially outward force can be generated without having to remove the seal (FIGS. 4 and 5) to break off the axial leg portion 23. The same breaking off of the axial leg portion 23 can be achieved by an external inwardly directed force or, depending on the shape of the rib 15, by applying an axial force thereto. However, as is apparent from FIGS. 2 and 6, the radial leg portion 24 is so wide, as viewed tangentially relative to the cylindrical portion 3, that high shear-resistance to tangential forces is effectively created and, thus, security against rotation and tangential force breakage is assured. In other words, a tangential force applied to the rib 15 will not cause rupture or fracture thereof, particularly along the notch 25. Otherwise stated, the rupture notch 25 is tangential to the various cylindrical portions of the housing 2 whereby shear forces in the tangential direction will not effect the rib 15, whereas axial or radial forces will effect breakage at the notch 25. The term "tangential" means essentially the direction perpendicular to the plane of FIGS. 6 through 9. Accordingly, if the right-hand side of electrical device housing 2 (FIG. 3) is to be inserted into a perfectly circular bore hole 13, absent the keyhole slot 14, the rib 15 is broken off across the radial leg portion 24 in the area of the notch 25 closely adjacent the exterior surface of the cylindrical portion 3, and this facilitates the introduction of the cylindrical portion 3 into the circular bore hole 13 without excessive deformation of the assembly plate 1 or the housing 2. Obviously, the rib 15 is not broken off when the housing 2 is associated with a bore hole 13 having the rectangular keyhole slot or groove 14 opening therein.

Figure 7:
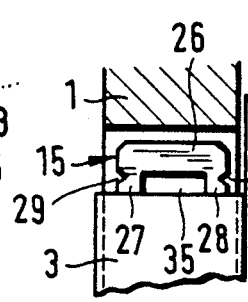

Reference is made to FIG. 7 of the drawings which illustrates another rib or key 15 which is of a generally inverted U-shaped configuration defined by a pair of radial leg portions 27, 28 integral with the cylindrical portion 3 and bridged by an axial leg or bight portion 26. The radial leg portions 27, 28 include respective weakening means or tangential notches 29, 30 such that the blade of a screwdriver can be inserted into a gap 35 between the cylindrical portion 3 and the axial leg or bail portion 26 to effect breakage of the legs 27, 28 immediately adjacent the exterior surface of the cylindrical portion 3.

Figures 8, 9:
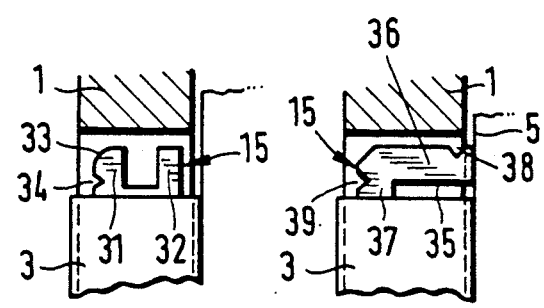

In FIG. 8 of the drawings another rib 18 is formed by two radial leg portions which are parallel to each other and are designated by the reference numerals 31, 32 with the former having a rounded corner 33 and a notch or weakening means 34. Because of the unattenuated widths, the ribs 31, 32 provide high shear resistance in the tangential direction but are easily and sequentially broken off under stress in other directions. The rounded corner 33 also facilitates ease of insertion into the slot 14, as described heretofore relative to the rib 15 of FIG. 6.

In FIG. 9, another rib or key 15 is illustrated which includes a radial leg portion 37 and an axial leg portion 36 respectively integral with the cylindrical portion 3 and the stop surface 5. The leg portions 37, 36 include respective weakening means or notches 39, 38. The axial leg portion 36 is also spaced from the exterior surface of the cylindrical portion 3 to define a gap 35 into which the blade of a screwdriver can be inserted to effect rupture of the leg portions 37, 36 essentially across the areas adjacent the respective notches 39, 38.

Although a preferred embodiment of the invention has been specifically illustrated and described herein, it is to be understood that minor variations may be made in the apparatus without departing from the spirit and scope of the invention, as defined the appended claims.

We claim:

1. A housing adapted to be affixed to an assembly plate through a substantially circular bore hole thereof which selectively includes or excludes a notch opening radially inwardly into the bore hole comprising a rib carried by said housing adapted for entry into a radially inwardly opening notch of an associated assembly plate, said rib possessing high shear resistance in a direction substantially tangential to said housing, and said rib including weakening means for effecting relatively low force break off of said rib upon the application of radial or axial forces thereto whereby said housing can be readily affixed to a substantially circular bore hole exclusive of a radially inwardly opening notch.

2. The housing as defined in claim 1 wherein said housing in part defines an electrical command or information device.

3. The housing as defined in claim 1 wherein said rib is of a substantially L-shaped configuration defined by a first radial leg portion and a second axial leg portion, and said second axial leg portion is spaced by a gap from an exterior surface of said housing.

4. The housing as defined in claim 1 wherein said rib is of a substantially L-shaped configuration defined by a first radial leg portion and a second axial leg portion, said second axial leg portion is spaced by a gap from an exterior surface of said housing, and said weakening means is a notch in said first radial leg portion.

5. The housing as defined in claim 1 wherein said rib is of a substantially L-shaped configuration defined by a first radial leg portion and a second axial leg portion, said second axial leg portion is spaced by a gap from an exterior surface of said housing, and said weakening means is a notch in said first radial leg portion spaced a slight distance from said exterior surface.

6. The housing as defined in claim 1 wherein said rib is of a substantially L-shaped configuration defined by a first radial leg portion and a second axial leg portion, said second axial leg portion is spaced by a gap from an exterior surface of said housing, and said weakening means is a tangential notch in said first radial leg portion spaced a slight distance from said exterior surface.

7. The housing as defined in claim 1 wherein said rib includes two radial leg portions spaced axially from each other.

8. The housing as defined in claim 1 wherein said rib includes two radial leg portions spaced axially from each other, and a leading one of said two radial leg portions includes an upper rounded corner.

9. The housing as defined in claim 1 wherein said rib includes two radial leg portions spaced axially from each other, and said weakening means is formed in one of said two radial leg portions.

10. The housing as defined in claim 1 wherein said rib includes two radial leg portions spaced axially from each other, and said weakening means is formed in a leading one of said two radial leg portions.

11. The housing as defined in claim 1 wherein said rib includes two radial leg portions spaced axially from each other, said weakening means is formed in one of said two radial leg portions, and said weakening means is a notch in said one radial leg portion.

12. The housing as defined in claim 1 wherein said rib includes two radial leg portions spaced axially from each other, said weakening means is formed in one of said two radial leg portions, and said weakening means is a tangential notch in said one radial leg portion.

13. The housing as defined in claim 1 wherein said rib includes two radial leg portions spaced axially from each other, said weakening means is formed in one of said two radial leg portions, and said weakening means is a notch in said one radial leg portion spaced a slight distance from said exterior surface.

14. The housing as defined in claim 1 wherein said rib is of a generally inverted U-shaped configuration defined by two axially spaced radial leg portions bridged by an axial portion.

15. The housing as defined in claim 1 wherein said rib is of a generally inverted U-shaped configuration defined by two axially spaced radial leg portions bridged by an axial portion, and said weakening means is a notch in each of said two radial leg portions.

16. The housing as defined in claim 1 wherein said rib is of a generally inverted U-shaped configuration defined by two axially spaced radial leg portions bridged by an axial portion, and said weakening means is a tangential notch in each of said two radial leg portions.

17. The housing as defined in claim 1 wherein said housing includes a substantially cylindrical exterior surface merging with a substantially radial stop surface, said rib is of a substantially L-shaped configuration defined by a first radial leg portion integral with said cylindrical exterior surface and a second axial leg portion integral with said stop surface, and said second axial leg portion is spaced by a gap from the cylindrical exterior surface of said housing.

18. The housing as defined in claim 1 wherein said housing includes a substantially cylindrical exterior surface merging with a substantially radial stop surface, said rib is of a substantially L-shaped configuration defined by a first radial leg portion integral with said cylindrical exterior surface and a second axial leg portion integral with said stop surface, said second axial leg portion is spaced by a gap from the cylindrical exterior surface of said housing, and said weakening means includes a notch in said radial leg portion and a notch in said axial leg portion adjacent said stop surface.

19. The housing as defined in claim 1 wherein said housing includes a substantially cylindrical exterior surface merging with a substantially radial stop surface, said rib is of a substantially L-shaped configuration defined by a first radial leg portion integral with said cylindrical exterior surface and a second axial leg portion integral with said stop surface, said second axial leg portion is spaced by a gap from the cylindrical exterior surface of said housing, and said weakening means includes a notch in said radial leg portion spaced a slight distance from said cylindrical exterior surface and a notch in said axial leg portion adjacent said stop surface.

20. The housing as defined in claim 1 wherein said housing includes a substantially cylindrical exterior surface merging with a substantially radial stop surface, a sealing plate defined by a tubular portion and a radial flange, said tubular portion being in exterior telescopic relationship to said housing cylindrical exterior surface, said radial flange being in abutment with said stop surface, and a radial through slot in said tubular portion through which said rib projects.

* * * * *